United States Patent
Sachdev et al.

(10) Patent No.: US 12,383,945 B2
(45) Date of Patent: Aug. 12, 2025

(54) METHODS OF MAKING A WIDE METAL SHEET

(71) Applicant: GM GLOBAL TECHNOLOGY OPERATIONS LLC, Detroit, MI (US)

(72) Inventors: Anil K. Sachdev, Rochester Hills, MI (US); Louis G. Hector, Jr., Shelby Township, MI (US); Andrew Clay Bobel, Troy, MI (US); Arianna T. Morales, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 764 days.

(21) Appl. No.: 17/516,463

(22) Filed: Nov. 1, 2021

(65) Prior Publication Data

US 2023/0140811 A1    May 4, 2023

(51) Int. Cl.
*B21B 15/00* (2006.01)
*B21B 3/00* (2006.01)
(Continued)

(52) U.S. Cl.
CPC ............ *B21B 15/0007* (2013.01); *B21B 3/00* (2013.01); *H01M 4/0435* (2013.01);
(Continued)

(58) Field of Classification Search
CPC ............ B21B 2015/0078; B21B 3/00; B21B 15/0007; B21B 2205/00; B21C 37/02;
(Continued)

(56) References Cited

U.S. PATENT DOCUMENTS

| 3,721,113 A | | 3/1973 | Hovsepian |
| 4,250,726 A | * | 2/1981 | Safian ................. B21B 3/00 72/38 |

(Continued)

FOREIGN PATENT DOCUMENTS

| CN | 106994490 A | 8/2017 |
| CN | 107635683 A | 1/2018 |

(Continued)

OTHER PUBLICATIONS

Matt et al, "Influence of high-speed impact cutting on the electromagnetic properties of non-oriented electrical steel sheets," 2023 13th International Electric Drives Production Conference (EDPC), Regensburg, Germany, 2023, pp. 1-6. (Year: 2023).*

(Continued)

*Primary Examiner* — A. Dexter Tugbang
(74) *Attorney, Agent, or Firm* — Harness, Dickey & Pierce, P.L.C.

(57) ABSTRACT

A method of preparing a metal sheet includes extruding a component along an extrusion axis. The component has a wall at least partially defining an interior region. The component includes a metal. The method further includes unfurling the wall to form a sheet precursor. The sheet precursor has a first thickness and a first transverse dimension. The method further includes rolling the sheet precursor along a rolling axis to form the metal sheet. The metal sheet has a second thickness perpendicular to the rolling axis. The second thickness is less than the first thickness. The second transverse dimension is parallel to the rolling axis. The second transverse dimension is greater than the first transverse dimension. In certain aspects, the metal includes lithium and the metal sheet is a lithium metal electrode.

17 Claims, 8 Drawing Sheets

(51) Int. Cl.
  *H01M 4/04*      (2006.01)
  *B21C 23/06*     (2006.01)
  *B21C 23/12*     (2006.01)
  *H01M 4/139*     (2010.01)
  *H01M 4/1395*    (2010.01)
  *H01M 10/0525*   (2010.01)

(52) U.S. Cl.
  CPC ... *B21B 2015/0078* (2013.01); *B21B 2205/00* (2013.01); *B21C 23/06* (2013.01); *B21C 23/12* (2013.01); *H01M 4/139* (2013.01); *H01M 4/1395* (2013.01); *H01M 10/0525* (2013.01)

(58) Field of Classification Search
  CPC ......... B21C 23/06; B21C 23/08; B21C 23/12; H01M 4/139; H01M 4/1395; H01M 4/661; H01M 10/0525; B22D 11/126
  See application file for complete search history.

(56) References Cited

U.S. PATENT DOCUMENTS

| | | | |
|---|---|---|---|
| 5,837,401 A | | 11/1998 | Gauthier et al. |
| 2005/0061047 A1* | | 3/2005 | Laliberte ................... B21B 3/00 72/147 |
| 2009/0178778 A1* | | 7/2009 | Seidel ................... B22D 11/126 164/460 |
| 2016/0096221 A1* | | 4/2016 | Anderseck ............. B21C 23/06 164/460 |
| 2020/0009626 A1 | | 1/2020 | Whalen et al. |
| 2021/0151737 A1* | | 5/2021 | Dube ........................ B21B 3/00 |

FOREIGN PATENT DOCUMENTS

| | | | | |
|---|---|---|---|---|
| CN | 116072820 A | | 5/2023 | |
| DE | 2838980 A1 | | 3/1979 | |
| DE | 102022122593 A1 | | 5/2023 | |
| EP | 0692669 A1 | | 1/1996 | |
| JP | 2018051529 A | * | 4/2018 | .............. B01F 7/083 |

OTHER PUBLICATIONS

First Office Action for German Patent Application No. 10 2022 122 593-A1 issued on Jun. 7, 2023, with correspondence from Manitz Finsterwald Patent—und Rechtsanwaltspartnerschaft mbB summarizing Office Action; 8 pages.

Kronthaler et al, "Laser Cutting in the Production of Lithium Ion Cells," SciVerse ScientDirect; Physics Procedia 39 ( 2012 ) pp. 213-224; www.sciencedirect.com.

Yan et al, "Effect of Processing Parameters on Edge Cracking in Cold Rolling," Copyright # Taylor & Francis Group, LLC; Materials and Manufacturing Processes, vol. 30; pp. 1174-1178, 2015.

Jansen et al, "Processing of Advanced Battery Materials-Laser Cutting of Pure Lithium Metal Foils," Batteries, vol. 4, 37; Published Aug. 6, 2018; http://www.mdpi.com/journal/batteries.

First Office Action for Chinese Patent Application No. 202211304234.6 issued Sep. 12, 2024, with correspondence from China Patent Agent (H.K.) Ltd summarizing Office Action; 16 pages.

Wen, Jinglin; "Planning Textbook for General Higher Education Metal Extrusion and Drawing and Cycle Cold Roll Forming Engineering"; Feb. 28, 2021; 5 pages.

Second Office Action for Chinese Patent Application No. 202211304234.6 issued Feb. 10, 2025, with correspondence from China Patent Agent (H.K.) Ltd summarizing Office Action; 13 pages.

* cited by examiner

METHODS OF MAKING A WIDE METAL SHEET

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to methods of making a wide metal sheet.

High-energy density electrochemical cells, such as lithium-ion batteries can be used in a variety of consumer products and vehicles, such as hybrid or electric vehicles. Battery powered vehicles show promise as a transportation option as technical advances continue to be made in battery power and lifetimes. Batteries may include components formed from or including metal sheets or foils.

SUMMARY

In various aspects, the present disclosure provides a method of preparing a metal sheet. The method includes extruding a component along an extrusion axis. The component has a wall at least partially defining an interior region. The component includes a metal. The method further includes unfurling the wall to form a sheet precursor. The sheet precursor has a first thickness and a first transverse dimension. The method further includes rolling the sheet precursor along a rolling axis to form the metal sheet. The metal sheet has a second thickness perpendicular to the rolling axis. The second thickness is less than the first thickness. The second transverse dimension is parallel to the rolling axis. The second transverse dimension is greater than the first transverse dimension.

In one aspect, the method further includes cutting the wall substantially parallel to the extrusion axis prior to the unfurling. The wall defines a cross-section substantially perpendicular to the extrusion axis. The cross-section forms a closed curve prior to the cutting.

In one aspect, the cutting is performed with a blade, a laser, a saw, a heated wire, a spark cutter, or any combination thereof.

In one aspect, the cutting is performed with a tool. The tool includes a body defining a tool axis and a blade extending from the body. The cutting comprises moving at least one of the tool and the component with respect to the other of the tool and the component such the body is at least partially in the interior region and the blade cuts through the wall.

In one aspect, the body defines a cone or a frusto-cone extending between a first end and a second end. The second end includes a base of the cone or the frusto-cone. The first end enters the interior region prior to the second end during the cutting.

In one aspect, the method further includes lubricating a surface of the wall prior to the rolling. The lubricating includes flowing lubricant through a passage defined in the body of the tool.

In one aspect, the wall defines a cylinder.

In one aspect, the cylinder defines an outer diameter of greater than or equal to about 50 mm to less than or equal to about 300 mm.

In one aspect, the wall defines a spiral.

In one aspect, the method further includes forming a plurality of sheets by cutting the wall after the unfurling.

In one aspect, the forming is performed prior to the rolling.

In one aspect, the rolling axis is substantially perpendicular to the extrusion axis.

In one aspect, the rolling axis is substantially parallel to the extrusion axis.

In one aspect, the second thickness is greater than or equal to about 20 µm to less than or equal to about 100 µm.

In one aspect, a surface of the metal sheet after the rolling has a mirror finish.

In one aspect, the metal comprises lithium, magnesium, tin, indium, aluminum, copper, nickel, or any combination thereof.

In one aspect, the rolling is performed with roller comprising a non-stick surface.

In one aspect, the method further includes, after the extruding and before the rolling, increasing a dimension of the component.

In one aspect, the dimension is one of a length substantially parallel to the extrusion axis or a transverse dimension substantially perpendicular to the extrusion axis.

In various aspects, the present disclosure provides a method of preparing a lithium metal electrode for an electrochemical cell. The method includes extruding a component along an extrusion axis. The component has a wall at least partially defining an interior region. The wall defines a cross-section substantially perpendicular to the extrusion axis. The cross-section forms a closed curve. The component includes lithium metal. The method further includes cutting the wall substantially parallel to the extrusion axis. The method further includes unfurling the wall to form a sheet precursor having a first thickness and a first transverse dimension. The method further includes rolling the sheet precursor along a rolling axis to form the lithium metal electrode. The lithium metal electrode has a second thickness perpendicular to the rolling axis and a second transverse dimension parallel to the rolling axis. The second thickness is less than the first thickness. The second transverse dimension is parallel to the rolling axis. The second transverse dimension is greater than the first transverse dimension.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In various aspects, the present technology pertains to rechargeable lithium-ion batteries, which may be used in vehicle applications. A typical electrochemical cell includes a first electrode, such as a positive electrode or cathode, a second electrode such as a negative electrode or an anode, an electrolyte, and a separator. Often, in a lithium-ion battery pack, electrochemical cells are electrically connected in a stack to increase overall output. Lithium-ion electrochemical cells operate by reversibly passing lithium ions between the negative electrode and the positive electrode. The separator and the electrolyte are disposed between the negative and positive electrodes. The electrolyte is suitable for conducting lithium ions and may be in liquid, gel, or solid form. Lithium ions move from a positive electrode to a negative electrode during charging of the battery, and in the opposite direction when discharging the battery.

Each of the negative and positive electrodes within a stack is typically electrically connected to a current collector (e.g., a metal, such as copper for the negative electrode and aluminum for the positive electrode). During battery usage, the current collectors associated with the two electrodes are connected by an external circuit that allows current generated by electrons to pass between the negative and positive electrodes to compensate for transport of lithium ions.

Electrodes can generally be incorporated into various commercial battery designs, such as prismatic shaped cells, wound cylindrical cells, coin cells, pouch cells, or other suitable cell shapes. The cells can include a single electrode structure of each polarity or a stacked structure with a plurality of positive electrodes and negative electrodes assembled in parallel and/or series electrical connections. In particular, the battery can include a stack of alternating positive electrodes and negative electrodes with separators disposed therebetween. While the positive electroactive materials can be used in batteries for primary or single charge use, the resulting batteries generally have desirable cycling properties for secondary battery use over multiple cycling of the cells.

Certain components of electrochemical cells, such as electrodes and/or current collectors, may be formed from metal sheets or foils. In one example, a negative electrode includes metallic lithium and may be a lithium metal electrode ("LME"). The lithium-ion battery may be a lithium-metal battery or cell. Metallic lithium for use in the negative electrode of a rechargeable battery has various potential advantages, including having the highest theoretical capacity and lowest electrochemical potential. Thus, batteries incorporating lithium-metal anodes can have a higher energy density that can potentially double storage capacity, so that the battery may be half the size.

Plate-like metal battery components, such as metal electrodes and current collectors for use in electrochemical cells (e.g., batteries), are typically made by extruding a metal sheet (i.e., a substantially planar sheet) and then rolling the sheet until a desired thickness is achieved. This may be performed in a single-step process, such as by using an extrusion press. Standard extrusion presses are limited in sheet width (e.g., to about 100 mm width). Therefore, without the use of more complex equipment, resulting metal sheet widths are also limited using these methods.

In various aspects, the present disclosure provides a method of manufacturing metal plates, such as for use in electrochemical cells. The method facilitates production of larger-width metal sheets without the use of complex equipment. The method generally includes extruding a three-dimensional ("3D") metal component having a wall that at least partially defines an interior region (e.g., a hollow cylinder, a spiral), unfurling the wall of the 3D component to increase its width (e.g., in the case of a hollow cylinder, the original width is a diameter and the width after unfurling is π-diameter), and then rolling the unfurled wall to a desired thickness, thereby further increasing at least one transverse dimension. When the 3D component is a closed shape, such as a cylinder, the method further includes cutting or otherwise opening the wall prior to unfurling. The method may optionally include lubricating the wall prior to rolling, separating individual sheets before or after rolling, and/or expanding a dimension of the 3D shape prior to unfurling.

Figure 1:
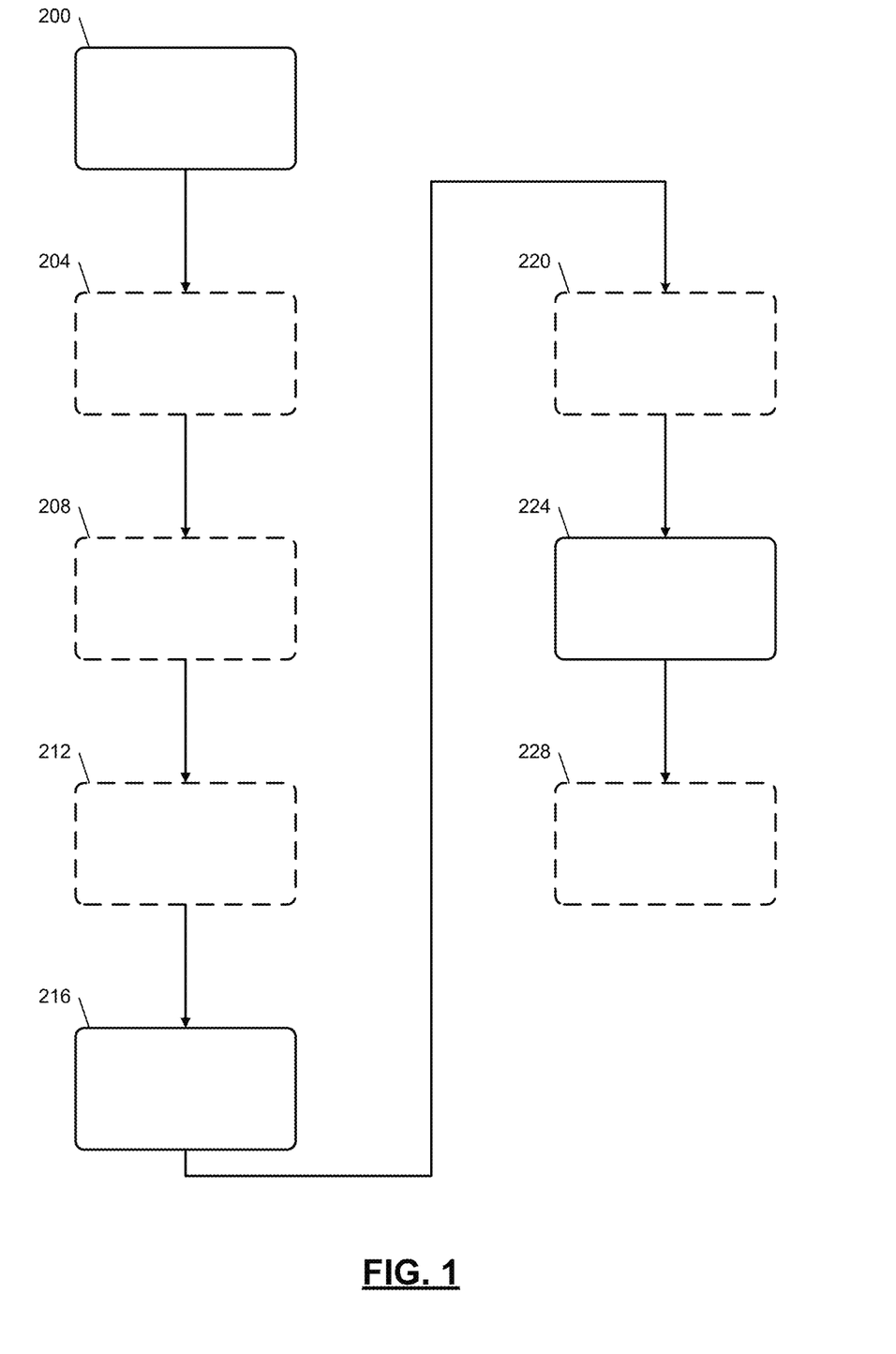
FIG. 1 is a flowchart depicting a method of making a metal sheet according to various aspects of the present disclosure.

With reference to FIG. 1, a method of manufacturing a metal sheet generally includes extruding a 3D component having a wall that at least partially defines an interior region at 200; optionally expanding one or more dimensions of the 3D component at 204; optionally opening the wall at 208 (i.e., when a cross-section of the 3D shape is a closed-curve shape); optionally lubricating the wall at 212; unfurling the wall at 216; optionally forming one or more sheets at 220, such as by cutting; rolling the wall/sheets to a desired thickness at 224; and optionally cutting the wall/sheets to form one or more sheets at 228. Each of these steps is described in greater detail below.

At 200, the method includes extruding a 3D component having a wall that at least partially defines an interior region. As used herein, a "3D component" is a component that that has two dimensions, substantially perpendicular to a direction of extrusion and one another (e.g., a width and a height), that have a similar order of magnitude (e.g., a difference in order of magnitude of less than or equal to about 2). In contrast to the 3D component according to certain aspects of the present disclosure, a sheet has a dimension (i.e., height/thickness) that is many orders of magnitude smaller than the other two dimensions (i.e., width, length). The 3D component is at least partially hollow such that it has a wall that at least partially defines an interior region. In certain aspects, the 3D component may be a cylinder, a spiral, a rectangular prism (e.g., a square prism), or an octagonal prism, by way of example.

The 3D component defines a longitudinal axis parallel to a direction of extrusion, as will be described in greater detail below. The 3D component defines a cross section substantially parallel to its longitudinal axis and the direction of extrusion. The cross section may be a closed curve or an open curve. Examples of closed curves include circles (see, e.g., FIG. 2) and ellipses. An example of an open curve is a spiral (see, e.g., FIG. 3).

The 3D component is formed from a metal, such as an elemental metal or alloys. The metal may include lithium, magnesium, tin, indium, aluminum, copper, nickel, or any combination thereof. In certain aspects, the 3D component consists essentially of the metal. In certain aspects, the metal may include one of the foregoing metals in combination with one or more other metals. In certain aspects, prior to extrusion, the metal may be provided as an ingot or billet. The extrusion may be performed using a hydraulic press that takes the solid cylindrical billet and pushes it through a die and embedded mandrel to create the hollow. Alternatively, the solid metal billet can be pushed around a mandrel that is held coaxially with the billet, with wall thickness of the extrusion defined by the difference between the outer dimension of the billet and the outer dimension of the mandrel.

Figure 2:
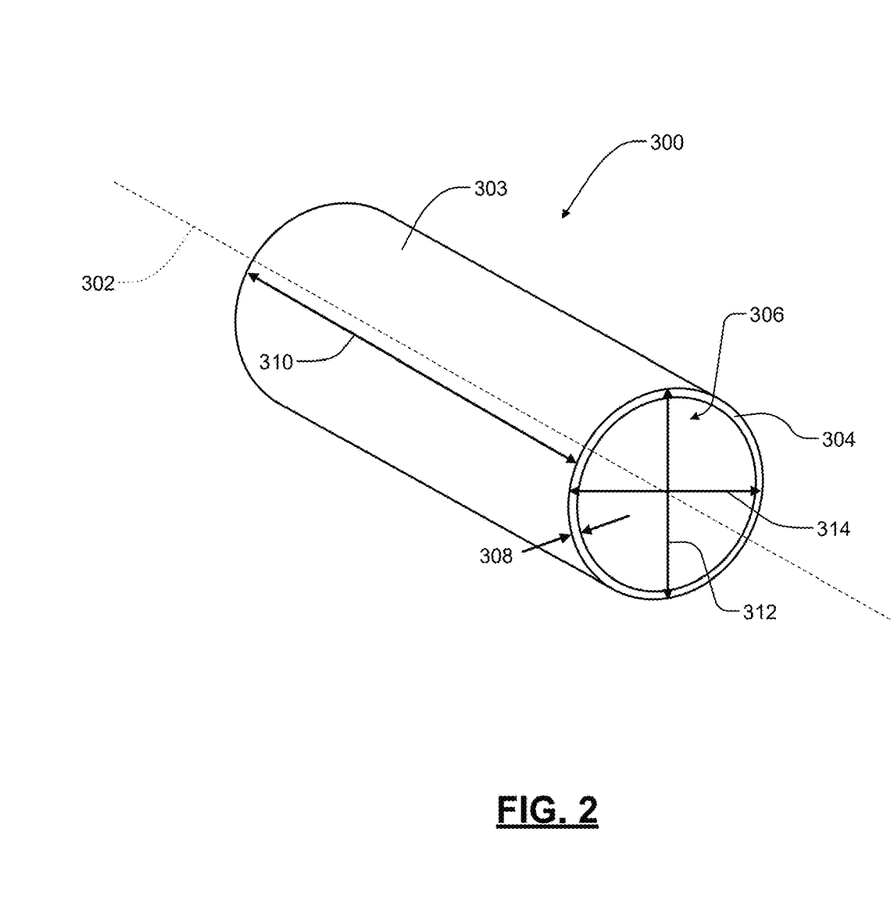
FIG. 2. is a perspective view of an extruded cylinder according to various aspects of the present disclosure.

Referring to FIG. 2, in various aspects, the 3D component is a cylinder 300. The cylinder 300 may be extruded along an extrusion axis 302 that is aligned with a longitudinal axis 303 of the cylinder 300. The cylinder 300 includes a wall 304. The wall 304 at least partially defines an interior region 306. The wall 304 may define a first thickness 308 of greater than or equal to about 2 mm, optionally greater than or equal to about 4 mm, optionally greater than or equal to about 6 mm, or optionally greater than or equal to about 8 mm. The first thickness 308 may be less than or equal to about 10 mm, optionally less than or equal to about 8 mm, optionally less than or equal to about 6 mm, or optionally less than or equal to about 4 mm. In certain aspects, the first thickness 308 may be greater than or equal to about 2 mm to less than or equal to about 10 mm, or optionally greater than or equal to about 4 mm to less than or equal to about 6 mm.

The cylinder 300 defines a first dimension or length 310 substantially parallel to the extrusion axis 302. The cylinder 300 further defines a second dimension or height 312 and a third dimension or width 314 substantially perpendicular to the extrusion axis 302. The second and third dimensions 312, 314 may be substantially perpendicular to one another. In certain aspects, the first, second, and third dimensions 310, 312, 314 may be referred to as first, second, and third component dimensions, respectively. In certain aspects, the second and third dimensions 312, 314 may be discrete, while the first dimension 310 continuously increases, such as in a continuous extrusion process. In certain aspects, the second and third dimensions 312, 314 are the same. For example, the cylinder 300 may be a right, circular cylinder, as shown, and the second and third dimensions 312, 314 may be a diameter. However, the second and third dimensions 312, 314 may alternatively be different. The second and third dimensions 312, 314 may each be greater than or equal to about 50 mm, optionally greater than or equal to about 100 mm, optionally greater than or equal to about 150 mm, optionally greater than or equal to about 200 mm, or optionally greater than or equal to about 250 mm. The second and third dimensions 312, 314 may each be less than or equal to about 300 mm, optionally less than or equal to about 250 mm, optionally less than or equal to about 200 mm, optionally less than or equal to about 150 mm, or optionally less than or equal to about 100 mm. In certain aspects, the second and third dimensions 312, 314 (e.g., diameter) may be greater than or equal to about 50 mm to less than or equal to about 300 mm.

Figure 3:
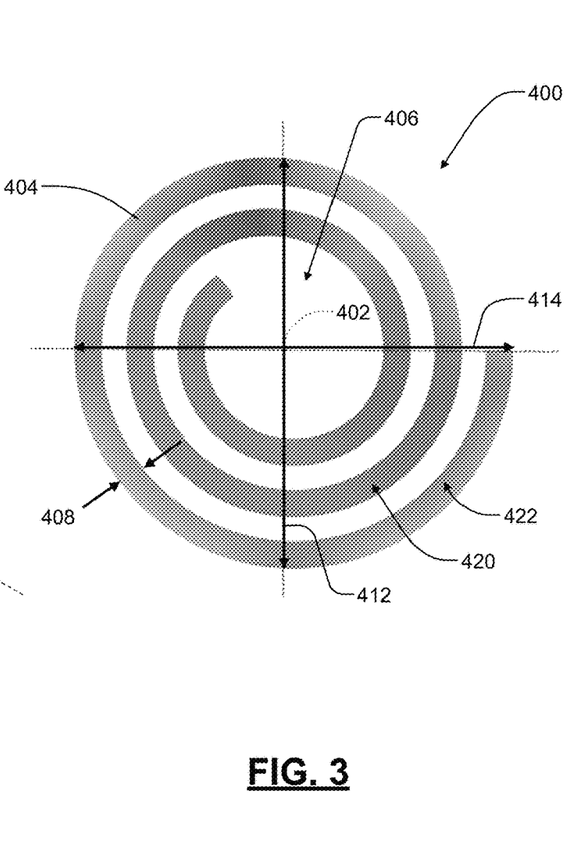
FIG. 3 is a cross-sectional view of an extruded spiral according to various aspects of the present disclosure.

With reference to FIG. 3, in various aspects, the 3D component is a spiral 400. The spiral 400 may be extruded along an extrusion axis 402 that extends out of the page. The spiral 400 includes a wall 404 that at least partially defines an interior region 406. The wall 404 may define a first thickness 408 of greater than or equal to about 2 mm, optionally greater than or equal to about 4 mm, optionally greater than or equal to about 6 mm, or optionally greater than or equal to about 8 mm. The first thickness 408 may be less than or equal to about 10 mm, optionally less than or equal to about 8 mm, optionally less than or equal to about 6 mm, or optionally less than or equal to about 4 mm. In certain aspects, the first thickness 408 may be greater than or equal to about 2 mm to less than or equal to about 10 mm, or optionally greater than or equal to about 4 mm to less than or equal to about 6 mm.

The spiral 400 defines a first dimension (not shown) substantially parallel to the extrusion axis 402. The spiral 400 further defines a second dimension 412 (e.g., height) and a third dimension 414 (e.g., width) substantially parallel to the extrusion axis 402. The first dimension, second dimension 412, and third dimension 414 may be substantially the same as the first dimension 310, second dimension 312, and third dimension 314 of the cylinder 300 of FIG. 2. In one example, the spiral 400 may include an inner coil 420 defining an inner coil diameter of about 100 mm and an outer coil 422 defining an outer coil diameter of about 150 mm. The outer coil diameter may correspond to the second and/or third dimension 412, 414.

Returning to FIG. 1, the method further includes optionally increasing one or more dimensions of the 3D component at 204. One or more dimensions of the 3D component may be increased after extrusion. In one example, a first dimension substantially parallel to a longitudinal axis and/or extrusion axis is increased (see, e.g., FIG. 4). In another example, a second and/or third dimension perpendicular to a longitudinal axis and/or extrusion axis is increased (see, e.g., FIG. 5). In another example, both the first dimension and the second and/or third dimension are increased. In certain other aspects, this step is omitted and the 3D shape is further processed without substantially altering any of the dimensions of the cylinder 300. Although the examples below are described in the context of the cylinder 300 (FIG. 2), dimensions of other 3D shapes may likewise be modified/increased.

Figure 4:
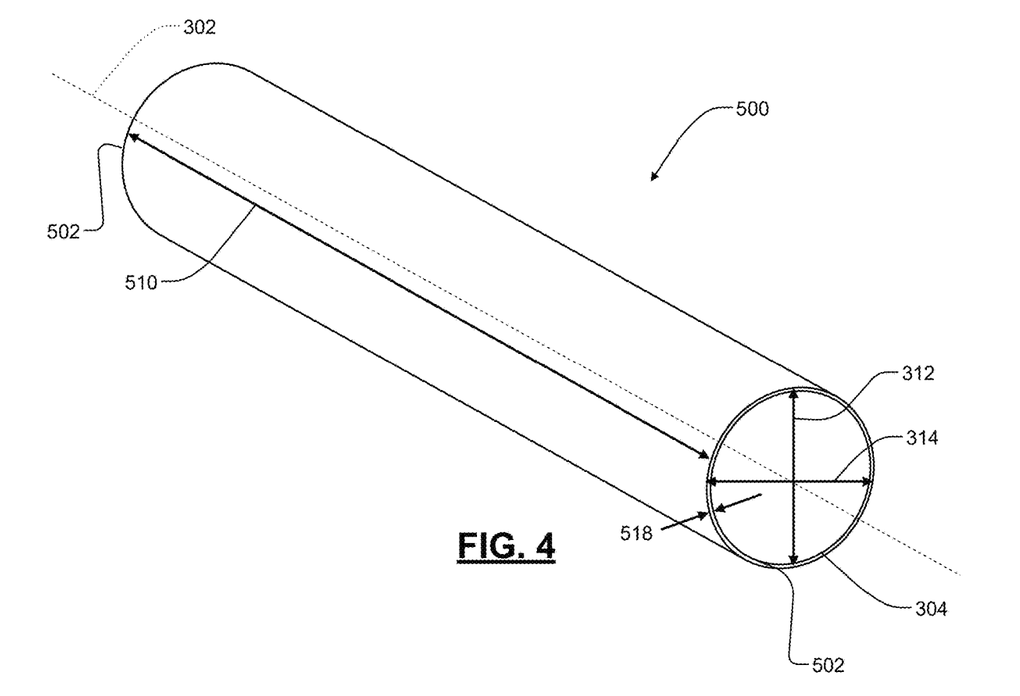
FIG. 4 is a perspective view of a cylinder formed by increasing a length of the cylinder of FIG. 2 according to various aspects of the present disclosure.

Referring to FIG. 4, a cylinder 500 according to various aspects of the present disclosure is provided. The cylinder 500 may be prepared by increasing a length of the cylinder 300 of FIG. 2. Length may be increased by clamping ends 502 of the cylinder 500 and stretching the same, by way of example. The cylinder 500 has a first dimension or length 510 that is greater than the first dimension 310 of the cylinder 300 of FIG. 2. Accordingly, the cylinder 500 also has a thickness 518 that is less than the thickness 308 of the cylinder 300 of FIG. 2. The cylinder 500 may have substantially the same second and third dimensions 312, 314 as the cylinder 300 of FIG. 2. In certain aspects, this process may be referred to as a "pre-thinning" process.

Figure 5:
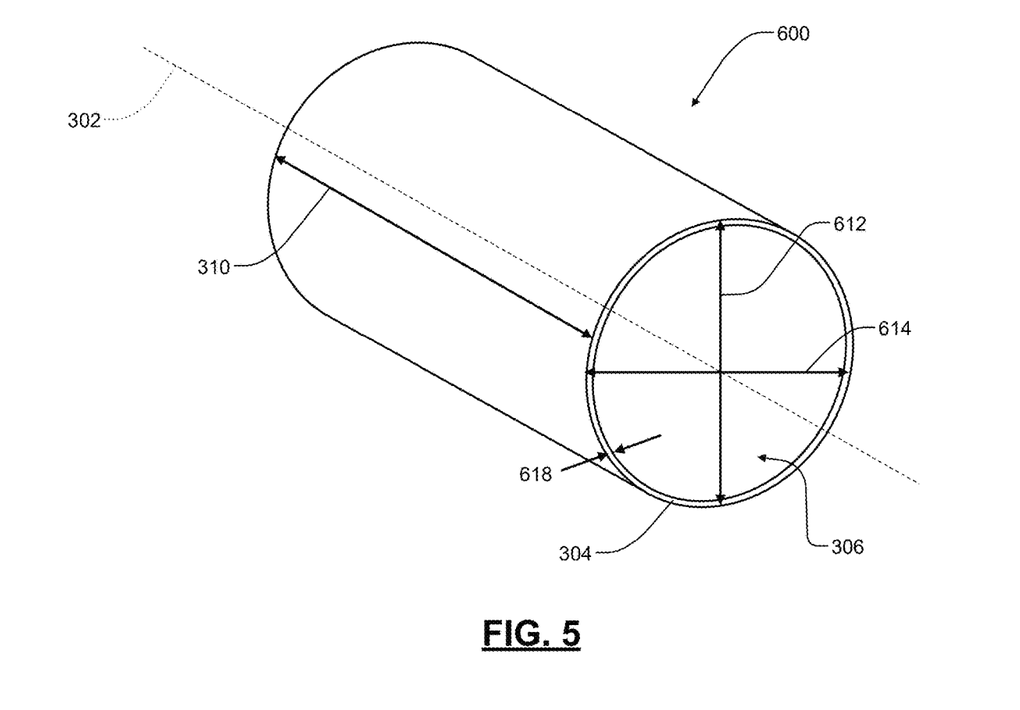
FIG. 5 is a perspective view of a cylinder formed by increasing a diameter of the cylinder of FIG. 2 according to various aspects of the present disclosure.

With reference to FIG. 5, a cylinder 600 according to various aspects of the present disclosure is provided. The cylinder 600 may be prepared by increasing a diameter of the cylinder 300 of FIG. 2. Diameter may be increased by pushing a mandrel (not shown) having a diameter larger than an inner diameter of the cylinder 300 (FIG. 2) into the interior region 306, by way of example. The cylinder 600 has a second dimension 612 and a third dimension 614 (i.e., diameter) that are greater than the second and third dimensions 312, 314 of the cylinder 300 of FIG. 2. Accordingly, the cylinder 600 also has a thickness 618 that is less than the thickness 308 of the cylinder 300 of FIG. 2. The cylinder 600 may have substantially the same first dimension 310 as the cylinder 300 of FIG. 2.

Returning to FIG. 1, at 208, the method optionally further includes opening a wall of the 3D component. This step is included when the cross-section of the 3D component is a closed-curve shape, such as a circle or an ellipse. The opening at 208 may be performed after the extruding at 208, including after optionally increasing a dimension at 204. In certain aspects, the opening at 208 may be performed concurrently with the extruding at 200, as will be described in greater detail below in the discussion accompanying FIG. 10. In certain aspects, opening the wall may include cutting the wall.

Figure 6:
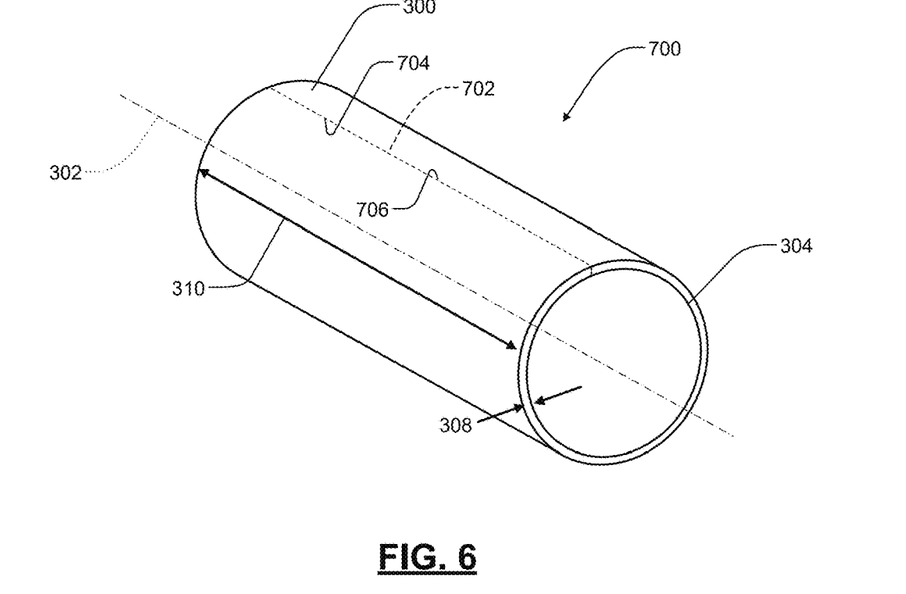
FIG. 6 is a perspective view of a cut cylinder formed by opening a wall of the cylinder of FIG. 2 according to various aspects of the present disclosure.

Referring to FIG. 6, in various aspects, an open component or cylinder 700, according to various aspects of the present disclosure is provided. The open cylinder 700 is formed by opening the wall 304 of the cylinder 300. The wall 304 may be opened at a boundary 702 by cutting or another separation process. The boundary 702 separates the wall 304 so that it has a first edge 704 and a second edge 706 that come together at the boundary 702. The boundary 702 may penetrate the entire thickness 308 of the wall 304. In certain aspects, the boundary 702 may extend along the entire length 310 of the wall. In certain aspects, cutting may be performed using a blade, such as a straight blade (see, e.g., discussion accompanying FIG. 10) or a rolling blade; a laser, such as a pulsed fiber laser; a saw; a heated wire; a spark cutter; or any combination thereof.

Returning to FIG. 1, the method may further include lubricating the wall at 212. Lubricating the wall at 208 may be performed at any time prior to rolling the wall at 224. For example lubricating the wall at 212 may be performed after opening the wall at 208, and before unfurling the wall at 216, as shown. In certain aspects, lubricating the wall at 212 may be performed concurrently with opening the wall at 208 (see, e.g., discussion accompanying FIG. 11).

Lubricating the wall may facilitate rolling at 224. One or both sides of the wall may be lubricated, depending on the rolling process to be used at 224. The lubricant may be applied via spraying, a brush, a sponge, dipping, or any combination thereof, by way of example, In certain aspects, the lubricant may be applied through passages in a cutting tool (see, e.g., discussion accompanying FIG. 11). The lubricant may include mineral oil, silicon oil, a solid lubricant (e.g., boron nitride, molybdenum disulfide, mica), or a combination thereof, by way of example.

At 216, the method includes unfurling the wall. Unfurling the wall may be performed by hand and/or using a tool, such as in-line roller set equipped for bending and unbending sheet metal. After unfurling, the wall may be substantially planar; however, some curvature may remain until rolling at 224 is completed. Unfurling may be performed alone, as a distinct step. Unfurling may also be performed concurrently with opening the wall at 208 or rolling at 224.

Figure 7:
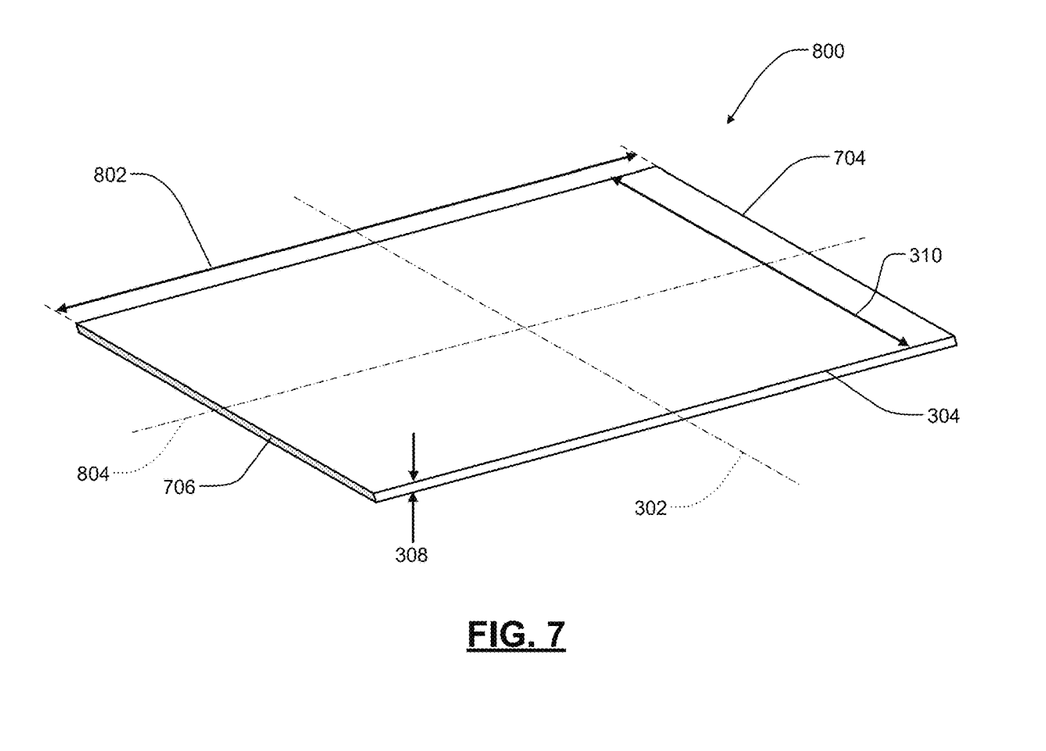
FIG. 7 is a perspective view of a sheet precursor formed by unfurling a wall of the cut cylinder of FIG. 6 according to various aspects of the present disclosure.

With reference to FIG. 7, a sheet precursor 800 according to various aspects of the present disclosure is provided. The sheet precursor 800 is formed by unfurling the wall 304 of the open cylinder 700 of FIG. 6. The sheet precursor 800 defines the length 310, also referred to as a first transverse dimension, and the thickness 308. The sheet precursor 800 defines a second transverse dimension 802 substantially parallel to an unfurling axis 804 and substantially perpendicular to the extrusion axis 302. The second transverse dimension 802 may be greater than or equal to about 100 mm, optionally greater than or equal to about 200 mm, optionally greater than or equal to about 300 mm, optionally greater than or equal to about 400 mm, optionally greater than or equal to about 500 mm, optionally greater than or equal to about 600 mm, optionally greater than or equal to about 700 mm, optionally greater than or equal to about 800 mm, optionally greater than or equal to about 900 mm, optionally greater than or equal to about 1,000 mm, or optionally greater than or equal to about 1,100 mm. The second transverse dimension 802 may be less than or equal to about 1,200 mm, optionally less than or equal to about 1,100 mm, optionally less than or equal to about 1,000 mm, optionally less than or equal to about 900 mm, optionally less than or equal to about 800 mm, optionally less than or equal to about 700 mm, optionally less than or equal to about 600 mm, optionally less than or equal to about 500 mm, optionally less than or equal to about 400 mm, optionally less than or equal to about 300 mm, or optionally less than or equal to about 200 mm. In certain aspects, the second transverse dimension 802 is greater than or equal to about 100 mm to less than or equal to about 1200 mm, optionally greater than or equal to about 500 mm to less than or equal to about 700 mm, or optionally about 600 mm. For example, when the 3D component is a cylinder, such as the cylinder 300 of FIG. 2, the second transverse dimension 802 is equal to $\pi$ (about 3.14) times an outer diameter of the cylinder 300 (i.e., the second and third dimensions 312, 314). Accordingly, the sheet precursor 800 prior to rolling at 224 (FIG. 1) is substantially larger than in methods a sheet precursor is formed directly via extrusion.

Unfurling may be similarly performed on open 3D components having other geometries, such as other opened/cut closed-curve-cross-section components (e.g., an opened elliptical cylinder), the spiral 400 of FIG. 3, or other open-curve-cross-section shapes.

Returning to FIG. 1, at 220, the method optionally includes forming one or more sheets. The method may include forming one or more sheets to improve ease of handling and/or to facilitate rolling in a cross-direction non-parallel to the extrusion axis (see, e.g., discussion accompanying FIG. 12). Forming one or more sheets may include subdividing a sheet precursor (e.g., the sheet precursor 800 of FIG. 7), such as by cutting.

Figure 8:
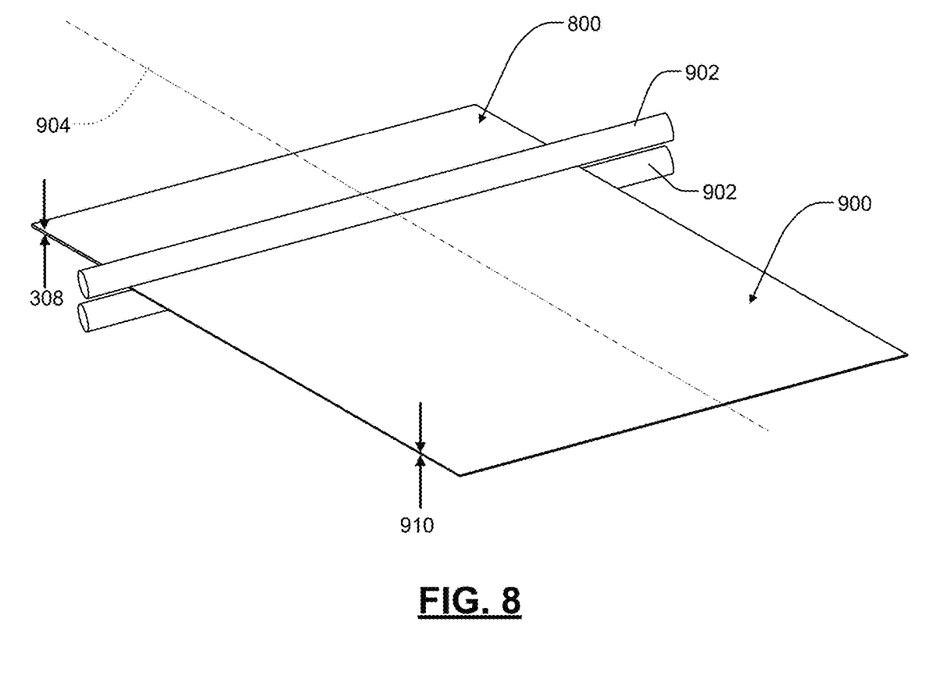
FIG. 8 is a schematic illustration of a method of rolling the sheet precursor of FIG. 7 according to various aspects of the present disclosure.

At 224, the method includes rolling the sheet precursor (i.e., the wall) to a desired thickness. Referring to FIG. 8, a rolling operation according to various aspects of the present disclosure is provided. The sheet precursor 800 may be rolled to form a metal sheet 900. In certain aspects, the rolling may be performed using one or more pairs of rollers 902. The sheet precursor 800 may be passed between the pair of rollers 902 along a rolling axis 904. The rollers 902 may be formed from and/or coated with a non-stick material. The non-stick material may include fluorinated polymers (e.g., per- and poly-fluoroalkyl substances (PFAS)), diamond-like carbon, boron nitride, alumina ($Al_2O_3$), titanium-nitride, titanium-carbide, tungsten, tungsten carbide, or any combination thereof. In certain aspects, the rolling process may use additional rollers, such as backup rollers configured to control elastic deformation. Moreover, the rolling process may include electronic controls configured to maintain motion of the sheet precursor 800 through the rollers and reduce or prevent side-to-side motion. Cracking of the sheet precursor 800 during rolling can be reduced or prevented by optimizing the first thickness 308, a reduction ratio (between first and second thicknesses 308, 910), tension, diameter of the rollers 902, and friction coefficient.

Prior to rolling the sheet precursor 800 has the first thickness 308. After rolling, the metal sheet 900 has a second thickness 910. The second thickness 910 is less than the first thickness 308. The second thickness 910 may be greater than or equal to about 20 μm, optionally greater than or equal to about 40 μm, optionally greater than or equal to about 60 μm, or optionally greater than or equal to about 80 μm. The second thickness 910 may be less than or equal to about 100 μm, optionally less than or equal to about 80 μm, optionally less than or equal to about 60 μm, or optionally less than or equal to about 40 μm. In certain aspects, the second thickness 910 may be greater than or equal to about 20 μm to less than or equal to about 100 μm, or optionally greater than or equal to about 20 μm to less than or equal to about 40 μm.

Figure 9:
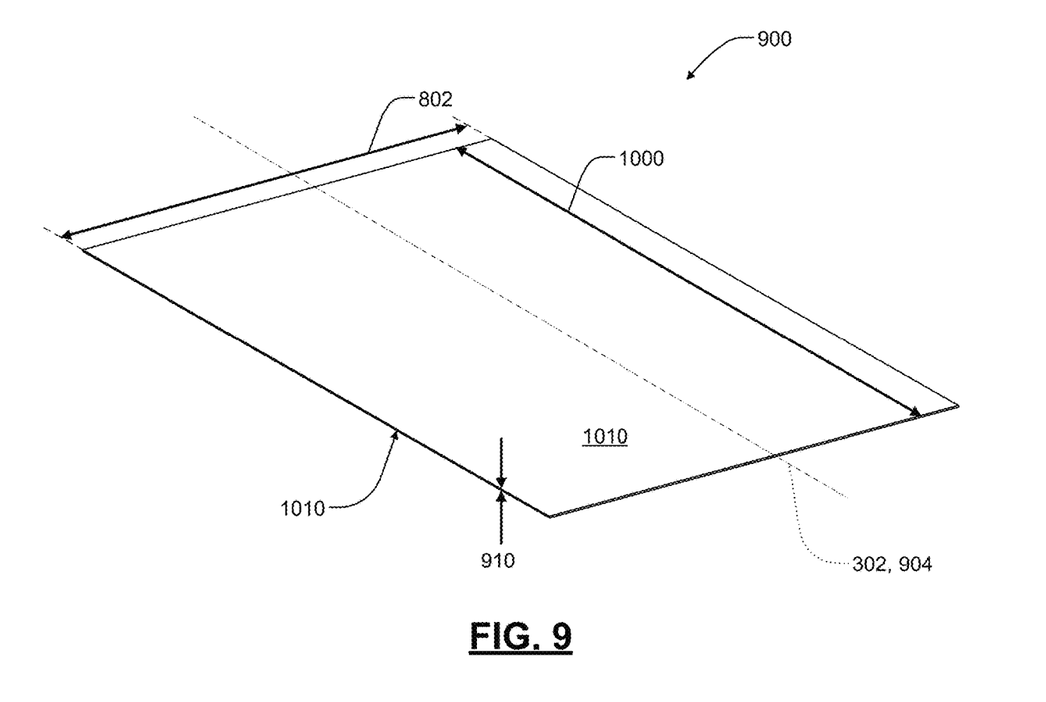
FIG. 9 is a perspective view of a metal sheet formed in the rolling of FIG. 8.

With reference to FIG. 9, the metal sheet 900 after rolling according to various aspects of the present disclosure is provided. The metal sheet 900 defines a third transverse dimension 1000 parallel to the rolling axis 904. The rolling axis 904 may be substantially parallel to the extrusion axis 302 (FIG. 2), as shown, the unfurling axis 804 (FIG. 7), or another axis. When the rolling axis 904 is substantially parallel to the extrusion axis 302, the third transverse dimension 1000 is larger than the first transverse dimension 310 (FIG. 7). However, when a rolling axis is instead substantially parallel to an unfurling axis (see discussion accompanying FIG. 12), a third dimension is larger than a second transverse dimension.

The metal sheet 900 includes surfaces 1010. The surfaces 1010 may be in direct contact with the rollers 902 (FIG. 8) during rolling. In certain aspects, each of the surfaces 1010 may define an average surface roughness (RA) of less than or equal to about 10 microinches, optionally less than or equal to about 8 microinches, or optionally less than or equal to about 4 microinches, by way of example. In certain aspects, the surfaces 1010 may have a mirror finish such that they are uniformly bright with a diffuse to specular reflection ratio of the order 0.005 in the rolling direction. The RA of the metal sheet 900 may be less than the RA of the sheet precursor 800 (FIG. 7). Accordingly, rolling may facilitate a reduction in RA, such as through the use of multiple sequential pairs of rollers that progressively decrease in roughness.

Returning to FIG. 1, at 228, the method may optionally include forming one or more individual sheets from the metal sheet 900 (FIG. 8). The method may optionally further include finishing steps, such as edge trimming (e.g., via wire cutting) to remove cracked portions of the sheet. In certain aspects, the metal sheet 900 may be a metal foil. The individual sheets may have dimensions suitable for use in an electrochemical cell, by way of example. The individual sheets may be used as electrodes (e.g., a lithium metal electrode).

While the metal sheets and related methods provided by the present technology are particularly suitable for use in components, such as electrochemical cells, of an automobile or other vehicles (e.g., motorcycles, boats, tractors, buses, motorcycles, trains, mobile homes, campers, and tanks), they may also be used in a variety of other industries and applications, including aerospace components, consumer goods, devices, buildings (e.g., houses, offices, sheds, warehouses), office equipment and furniture, and industrial equipment machinery, agricultural or farm equipment, or heavy machinery, by way of example.

Example 1

Figure 10:
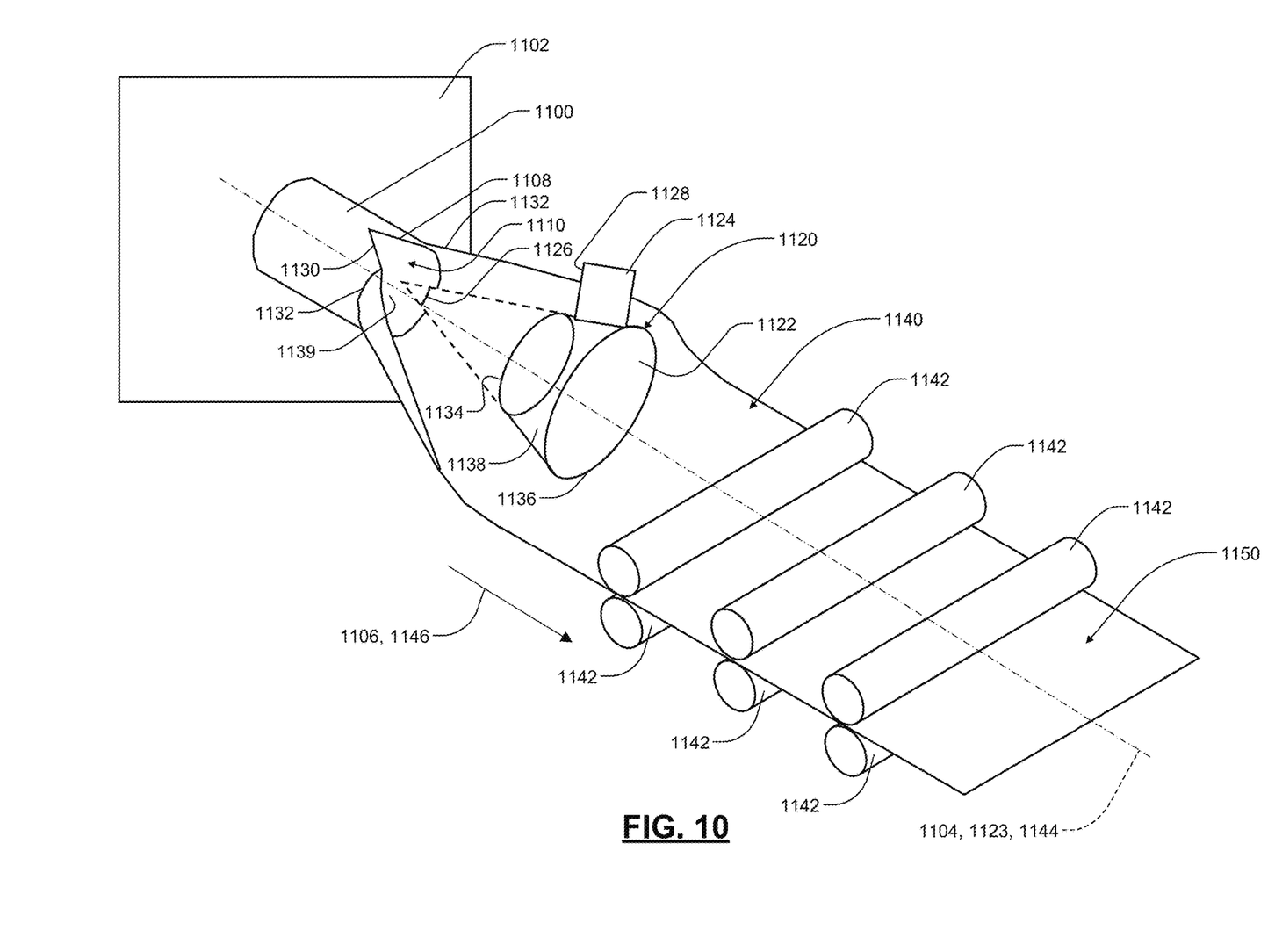
FIG. 10 is schematic view of a method of making a metal sheet according to various aspects of the present disclosure.

In various aspects, extruding a 3D component at 200, opening a wall of the 3D component at 208, unfurling the wall at 216, and rolling the wall at 224 may be performed in a continuous process. Referring to FIG. 10, a schematic of an example continuous process according to various aspects of the present disclosure is provided.

The method includes extruding a cylinder 1100 from an extruder 1102 along an extrusion axis 1104. The cylinder 1100 may exit the extruder 1102 in an extrusion direction 1106 parallel to the extrusion axis 1104. The cylinder 1100 includes a wall 1108 that at least partially defines an interior region 1110.

As the cylinder 1100 moves in the extrusion direction 1106, it makes contact with a cutting tool 1120. The cutting tool 1120 includes a body 1122 and a cutting blade 1124. The body 1122 defines an axis 1123 that may be parallel to the extrusion axis 1104 during cutting. The body 1122 may define a frusto-conical or conical shape (optional cone tip shown in dashed lines). The body 1122 may define an angle 1126 of greater than or equal to about 45°, optionally greater than or equal to about 60°, optionally greater than or equal to about 75°, optionally greater than or equal to about 90°, or optionally greater than or equal to about 105°. The angle 1126 may be less than or equal to about 120°, optionally less than or equal to about 105°, optionally less than or equal to about 90°, optionally less than or equal to about 75°, or optionally less than or equal to about 60°. In certain aspects, the angle 1126 is greater than or equal to about 45° to less than or equal to about 120°. The blade 1124 extends outward from the body 1122 and defines a cutting edge 1128. In certain aspects, the body 1122 may define other shapes, such as when the 3D component has a noncircular cross-section.

During cutting, at least one of the cylinder 1100 and the cutting tool 1120 translates (e.g., along the extrusion axis) with respect to the other of the cylinder 1100 and the cutting tool 1120. For example, the cutting tool 1120 may remain stationary (i.e., rigidly held in place) while the cylinder 1100 is ejected from the extruder 1102 in the extrusion direction 1106. During the translation, the body 1122 is at least partially disposed in the interior region 1110 of the cylinder 1100 and the cutting edge 1128 engages the wall 1108 of the cylinder 1100 to form a cut 1130 having edges 1132. A first (smaller) end 1134 of the cutting tool 1120 may enter the interior region 1110 prior to a second (larger) end 1136 of the cutting tool 1120. In certain aspects, an outer surface 1138 of the body 1122 may engage an inner surface 1139 of the cylinder 1100 to partially or fully unfurl the cylinder 1100 and form a sheet precursor 1140.

Following unfurling, the sheet precursor is passed through one or more pairs of rollers 1142 along a rolling axis 1144 in a rolling direction 1146 to produce a metal sheet 1150 achieve a desired thickness and roughness. The rolling axis 1144 and the extrusion axis 1104 may be aligned. The use of multiple pairs of rollers 1142 may reduce or eliminate flexing and distortion of the sheet precursor 1140 and the metal sheet 1150. In certain aspects, each pair of rollers 1142 may facilitate further reduction in thickness and/or roughness of the sheet precursor 1140.

Example 2

Figure 11:
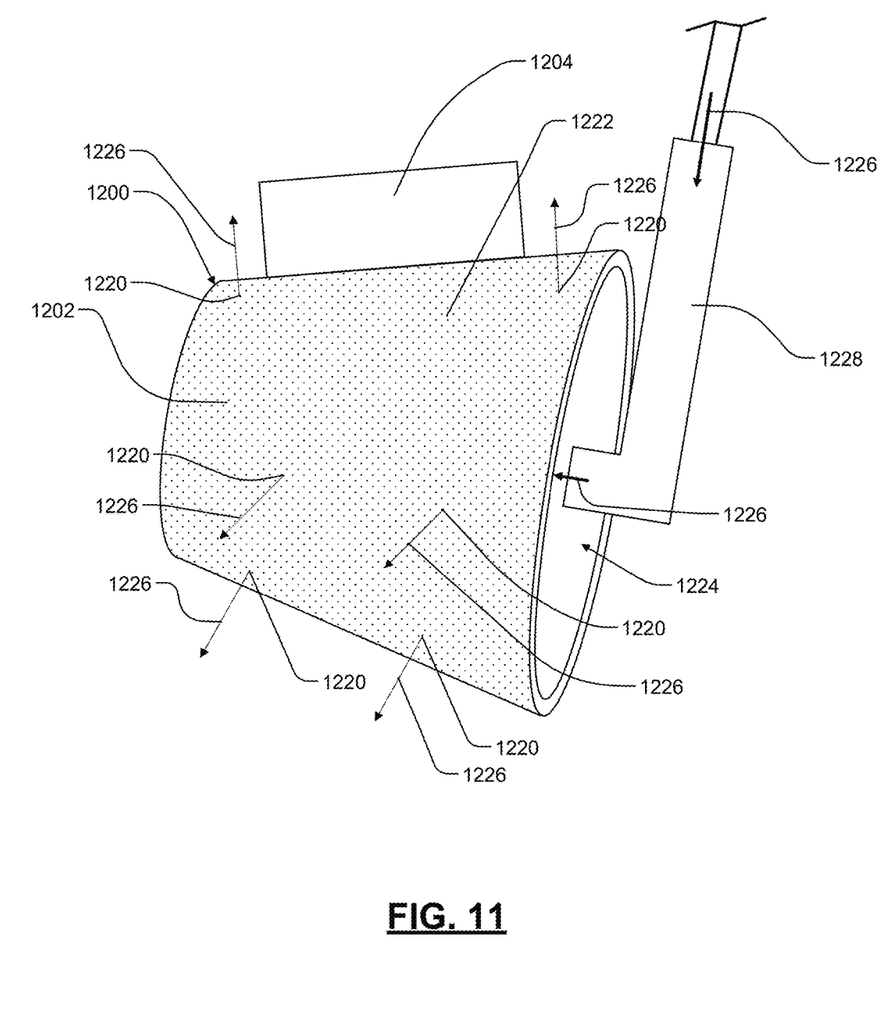
FIG. 11 is a perspective view of a cutting and lubricating tool according to various aspects of the present disclosure.

In various aspects, the present disclosure provides a cutting tool for concurrently cutting, lubricating, and unfurling a wall. With reference to FIG. 11, a cutting tool 1200 according to various aspects of the present disclosure is provided. Unless otherwise described, the cutting tool 1200 may be similar to the cutting tool 1120 of FIG. 10. The cutting tool 1200 includes a body 1202 and a cutting blade 1204.

The body 1202 may define a plurality of passages. The passages may include holes or pores 1220, as shown, or channels, by way of example. The pores 1220 may be provided over a portion of an outer surface 1222 of the body 1202 or the entire outer surface 1222 of the body 1202. The pores 1220 may define any shape (e.g., circular, hexagonal, etc.) and be provided in any pattern. When the passages include channels, the channels may be formed in an outer surface of a body of the tool and extend substantially transverse to a direction of unfurling.

In certain aspects, the body 1202 is at least partially hollow. The pores 1220 may be fluidly connected to an interior region 1224 of the body 1202. The interior region 1224 may receive a lubricant 1226, such as from a nozzle 1228. The lubricant 1226 may be guided through the pores 1220 to a surface of a wall of a 3D component as it unfurls.

In another example, the passages include channels formed in an outer surface of a body of a cutting tool transverse to an unfurling axis.

Example 3

Figure 12:
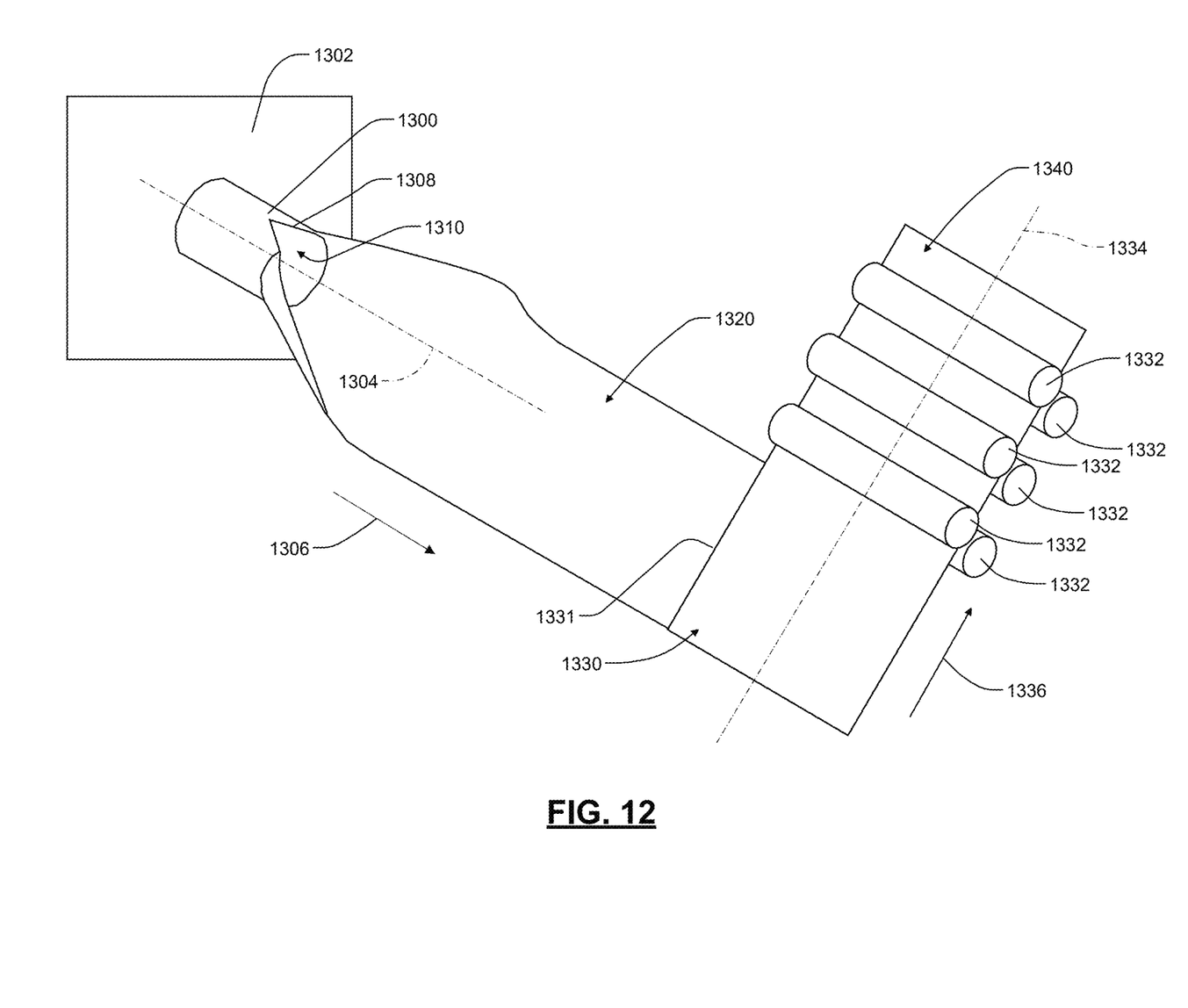
FIG. 12 is a schematic view of a method of making a metal sheet according to various aspects of the present disclosure.

In various aspects, the methods of the present disclosure may be performed using non-aligned extrusion and rolling axes. With reference to FIG. 12, a schematic example of such a method according to various aspects of the present disclosure is provided. The method includes extruding a cylinder 1300 from an extruder 1302 along an extrusion axis 1304. The cylinder 1300 may exit the extruder 1302 in an extrusion direction 1306 parallel to the extrusion axis 1304. The cylinder 1300 includes a wall 1308 that at least partially defines an interior region 1310.

The cylinder 1300 may be cut in a similar manner as the cylinder 1100 to form a sheet precursor 1320. The sheet precursor 1320 may be further cut or otherwise separated into one or more individual sheets 1330, such as at a boundary or cut 1331. Each of the individual sheets 1330 may be passed between one or more pairs of rollers 1332 along a rolling axis 1334 in a rolling direction 1336 to produce a metal sheet 1340. The rolling axis 1334 is non-parallel to the extrusion axis 1304. In certain aspects, the rolling axis 1334 is substantially perpendicular to the extrusion axis 1304.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

What is claimed is:

1. A method of preparing a metal sheet, the method comprising:
    extruding a component along an extrusion axis, the component having a wall at least partially defining an interior region, and the component comprising a metal;
    cutting, with a tool comprising a body defining a tool axis and a blade extending from the body, the wall substantially parallel to the extrusion axis, the wall defining a cross-section substantially perpendicular to the extrusion axis, the cross-section forming a closed curve prior to the cutting, the cutting including,
        moving at least one of the tool and the component with respect to the other one of the tool and the component such the body is at least partially in the interior region and the blade cuts through the wall
    unfurling the wall to form a sheet precursor having a first thickness and a first transverse dimension; and
    rolling the sheet precursor along a rolling axis to form the metal sheet, the metal sheet having a second thickness perpendicular to the rolling axis, the second thickness less than the first thickness, and a second transverse dimension parallel to the rolling axis, the second transverse dimension greater than the first transverse dimension.

2. The method of claim 1, wherein the wall defines a cylinder.

3. The method of claim 2, wherein the cylinder defines an outer diameter of greater than or equal to about 50 mm to less than or equal to about 300 mm.

4. The method of claim 1, wherein
    the body defines a cone or a frusto-cone extending between a first end and a second end, the second end including a base of the cone or the frusto-cone, and
    the first end enters the interior region prior to the second end during the cutting.

5. The method of claim 1, further comprising:
    lubricating a surface of the wall prior to the rolling, the lubricating including flowing lubricant through a passage defined in the body of the tool.

6. The method of claim 1, wherein the wall defines a spiral.

7. The method of claim 1, further comprising:
    forming a plurality of sheets by cutting the wall after the unfurling.

8. The method of claim 7, wherein the forming is performed prior to the rolling.

9. The method of claim 8, wherein the rolling axis is substantially perpendicular to the extrusion axis.

10. The method of claim 1, wherein the rolling axis is substantially parallel to the extrusion axis.

11. The method of claim 1, wherein the second thickness is greater than or equal to about 20 μm to less than or equal to about 100 μm.

12. The method of claim 1, wherein a surface of the metal sheet after the rolling has a mirror finish.

13. The method of claim 1, wherein the metal comprises lithium, magnesium, tin, indium, aluminum, copper, nickel, or any combination thereof.

14. The method of claim 1, wherein the rolling is performed with roller comprising a non-stick surface.

15. The method of claim 1, further comprising:
    after the extruding and before the rolling, increasing a dimension of the component.

16. The method of claim 15, wherein the dimension is one of a length substantially parallel to the extrusion axis or a transverse dimension substantially perpendicular to the extrusion axis.

17. A method of preparing a metal sheet, the method comprising:
    extruding a component along an extrusion axis, the component having a wall at least partially defining an interior region, and the component comprising a metal;
    cutting the wall substantially parallel to the extrusion axis, the wall defining a cross-section substantially perpendicular to the extrusion axis, the cross-section forming a closed curve prior to the cutting, the cutting being performed with a tool comprising a body defining a tool axis and a blade extending from the body, the cutting comprising moving at least one of the tool and the component with respect to one another such the body is at least partially in the interior region and the blade cuts through the wall;
    after the cutting, unfurling the wall to form a sheet precursor having a first thickness and a first transverse dimension; and rolling the sheet precursor along a rolling axis with a plurality of pairs of rollers to form the metal sheet, the metal sheet having a second thickness perpendicular to the rolling axis, the second thickness less than the first thickness, and a second transverse dimension parallel to the rolling axis, the second
transverse dimension greater than the first transverse dimension.

\* \* \* \* \*